(12) United States Patent
Ashiya et al.

(10) Patent No.: US 8,939,479 B2
(45) Date of Patent: Jan. 27, 2015

(54) VEHICLE BUMPER

(75) Inventors: Hotaka Ashiya, Isehara (JP); Kazumi Hisajima, Yamato (JP); Teruaki Aoki, Yokohama (JP); Takuji Kugaya, Hadano (JP); Takahide Ishida, Isehara (JP); Kunji Nagae, Atsugi (JP); Daisuke Oiki, Zama (JP); Tarou Ikeda, Sagamihara (JP); Masaru Tsuruta, Ebina (JP); Yasuo Yotsunaga, Fujisawa (JP); Shunsuke Ehara, Sagamihara (JP); Norimasa Mizutani, Hiratsuka (JP); Sylvain David, Sagamihara (JP); Nobuhiro Iwai, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/821,071

(22) PCT Filed: Sep. 30, 2011

(86) PCT No.: PCT/JP2011/072536
§ 371 (c)(1),
(2), (4) Date: Mar. 6, 2013

(87) PCT Pub. No.: WO2012/046647
PCT Pub. Date: Apr. 12, 2012

(65) Prior Publication Data
US 2013/0168982 A1 Jul. 4, 2013

(30) Foreign Application Priority Data
Oct. 8, 2010 (JP) ................................. 2010-228568

(51) Int. Cl.
*B60R 19/18* (2006.01)

(52) U.S. Cl.
CPC ......... *B60R 19/18* (2013.01); *B60R 2019/1873* (2013.01)
USPC ........................................... 293/120; 293/102

(58) Field of Classification Search
USPC ........ 296/187.03, 187.04; 293/120, 121, 122, 293/102
See application file for complete search history.

(56) References Cited

U.S. PATENT DOCUMENTS

| 6,846,026 | B2 | 1/2005 | Detwiler et al. |
| 7,144,055 | B2 | 12/2006 | Kimura et al. |

(Continued)

FOREIGN PATENT DOCUMENTS

| JP | 2003-285704 A | 10/2003 |
| JP | 2004-338539 A | 12/2004 |

(Continued)

OTHER PUBLICATIONS

Supplementary European Search Report dated Jan. 29, 2014, (6 pgs.).

*Primary Examiner* — Joseph D Pape
(74) *Attorney, Agent, or Firm* — Foley & Lardner LLP

(57) ABSTRACT

A bumper absorber (9) has a squared U-shaped cross section formed of: a vertical face (11) extending in a top-bottom direction and a vehicle width direction, and a top face (12) and a bottom face (13) respectively extending rearward from a top end and a bottom end of the vertical face (11). The bumper absorber (9) is configured such that the top face (12) and the bottom face (13) thereof are supported by the bumper reinforcement (10) via multiple attachment members (23 to 27), and an interval between the attachment members adjacent to each other in the vehicle width direction is set to decrease from end portions (9b) in the vehicle width direction toward a central portion (9a) in the vehicle width direction.

10 Claims, 8 Drawing Sheets

(56) References Cited

U.S. PATENT DOCUMENTS

| | | |
|---|---|---|
| 7,533,927 B2 | 5/2009 | Ito et al. |
| 7,891,715 B2 * | 2/2011 | Noyori et al. ............. 293/121 |
| 7,896,410 B2 | 3/2011 | Morikawa et al. |
| 2003/0168869 A1 | 9/2003 | Detwiler et al. |
| 2005/0248164 A1 | 11/2005 | Kimura et al. |
| 2007/0200375 A1 | 8/2007 | Ito et al. |
| 2009/0206618 A1 | 8/2009 | Ralston et al. |
| 2009/0267367 A1 | 10/2009 | Morikawa et al. |

FOREIGN PATENT DOCUMENTS

| | | |
|---|---|---|
| JP | 2005-319859 A | 11/2005 |
| JP | 2006-341634 A | 12/2006 |
| JP | 2007-223515 A | 9/2007 |
| JP | 2009-035027 A | 2/2009 |
| WO | WO 2006/132396 A1 | 12/2006 |

* cited by examiner

FIG. 3
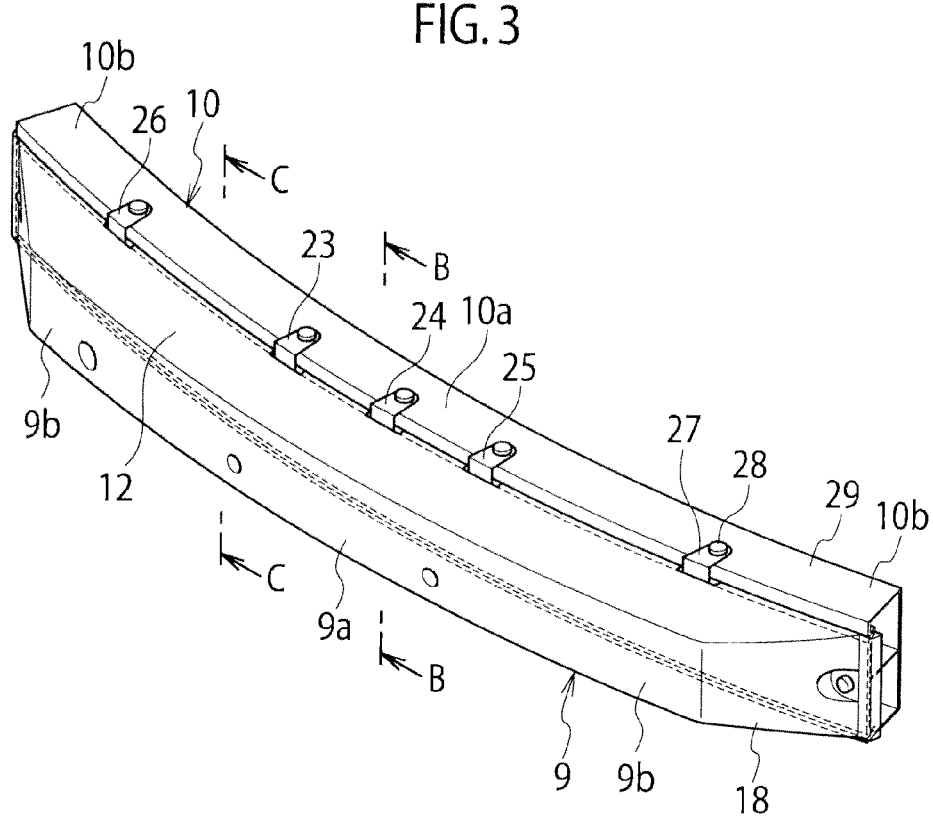
FIG. 4
(a) 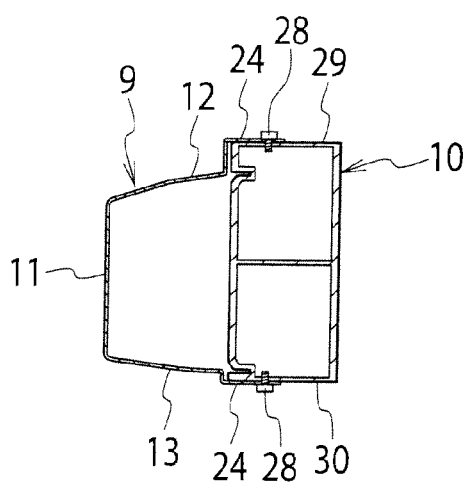
(b) 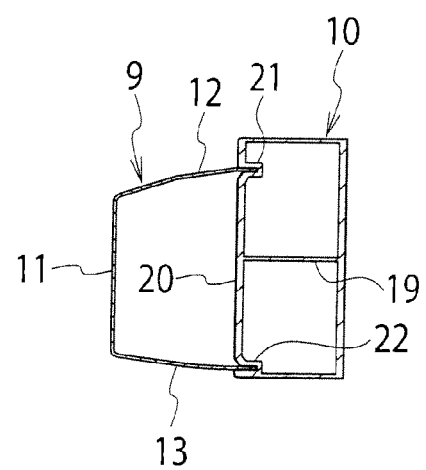

FIG. 8
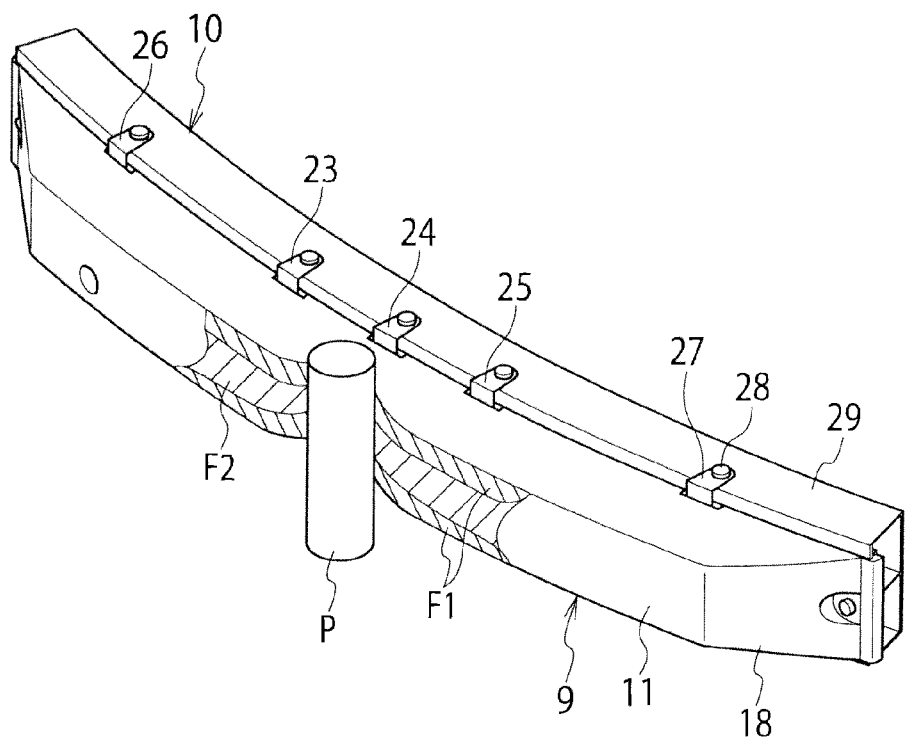
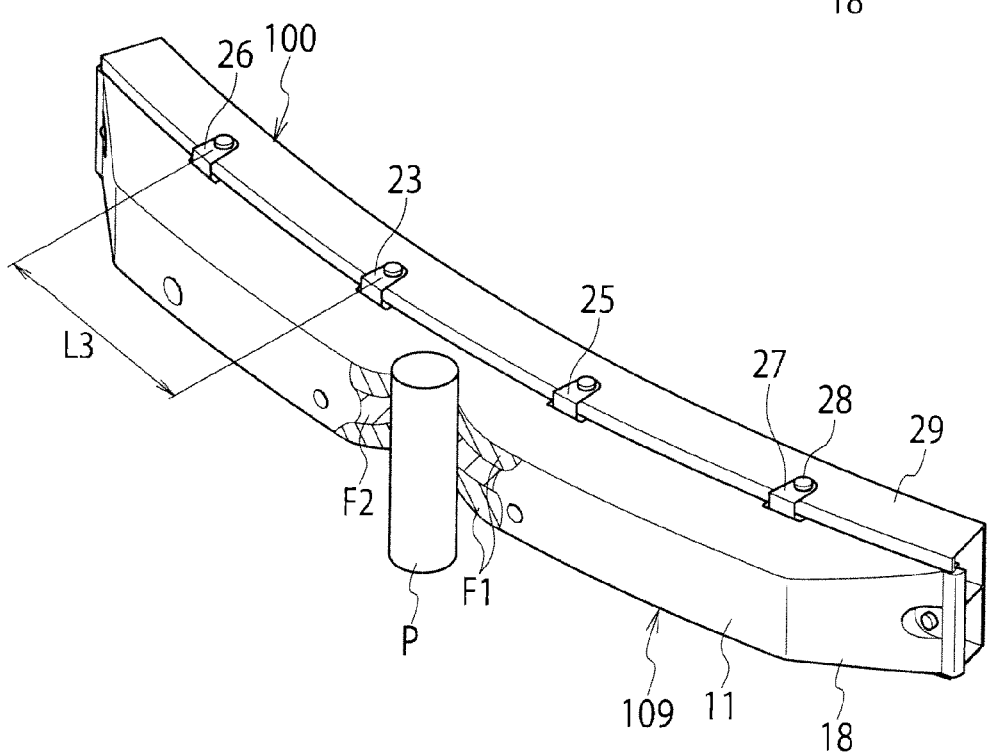

(a) (b)

VEHICLE BUMPER

TECHNICAL FIELD

The present invention relates to a vehicle bumper.

BACKGROUND ART

Heretofore, a front bumper provided with an energy absorber on a front side of its bumper reinforcement has been known. A front face of the energy absorber is formed into an arc shape in a plan view, so that when the vehicle causes a frontal crash, a central portion of the energy absorber in a vehicle width direction is compressively deformed most largely, and the compressive deformation amount decreases at end portions thereof in the vehicle width direction. Hence, to equalize the amount of impact energy to be absorbed along the entire vehicle width direction, there is developed a bumper provided with an energy absorber whose sectional area gradually increases toward a central portion thereof in the vehicle width direction (see Patent Document 1, for example).

PRIOR ART DOCUMENT

Patent Document

Patent Document 1: Japanese Patent Application Publication No. 2006-341634

SUMMARY OF INVENTION

However, to manufacture the energy absorber described in Patent Document 1 described above, there is a problem that many processes are required for manufacturing techniques such as gradually varying a shape of the inside of a die from its end portions toward the central portion in the vehicle width direction.

Accordingly, the present invention aims to provide a vehicle bumper which can be manufactured through less manufacturing processes, and is capable of absorbing an equal amount of energy in a large area along the vehicle width direction.

A vehicle bumper according to the present invention is a vehicle bumper extending in a vehicle width direction at a front end or a rear end of a vehicle, whose central portion in the vehicle width direction is arranged outside in a front-rear direction of the vehicle more than end portions thereof in the vehicle width direction. A bumper fascia is provided in the front end or the rear end of the vehicle, a bumper absorber is provided inside the bumper fascia in the front-rear direction, and a bumper reinforcement supporting the bumper absorber is provided inside the bumper absorber in the front-rear direction. The bumper absorber has a squared U-shaped cross section formed of: a vertical face extending in a top-bottom direction and the vehicle width direction, and a top face and a bottom face respectively bending and extending from a top end and a bottom end of the vertical face inward in the front-rear direction.

The present invention is characterized in that while the bumper absorber has a higher stiffness at the end portions in the vehicle width direction than at the central portion in the vehicle width direction, the support stiffness of the bumper absorber for the bumper reinforcement is set to be higher at the central portion in the vehicle width direction than at the end portions in the vehicle width direction.

Hence, according to the present invention, it is possible to manufacture through less manufacturing processes the vehicle bumper capable of absorbing an equal amount of energy in a large area along the vehicle width direction. Additionally, it is efficient since the supporting stiffness of the bumper absorber for the bumper reinforcement can be varied by a simple structure change.

BRIEF DESCRIPTION OF DRAWINGS

FIG. 3 is a perspective view showing a bumper absorber and a bumper reinforcement according to the first embodiment of the present invention.

In FIG. 4, part (a) is a sectional view taken along a line B-B of FIG. 3, and part (b) is a sectional view taken along a line C-C of FIG. 3.

FIG. 8 Part (a) is a load distribution chart after deformation where an impact load is applied to the bumper absorber according to the first embodiment, and part (b) is a load distribution chart after deformation where an impact load is applied to a bumper absorber according to a comparative example.

DESCRIPTION OF EMBODIMENTS

Hereinafter, embodiments of the present invention will be described in detail with reference to the drawings. Note that although a front bumper is used as an example in the following embodiments, the present invention is also applicable to a rear bumper provided in a vehicle rear end.

First Embodiment

Firstly, a first embodiment will be described.

Figure 1:
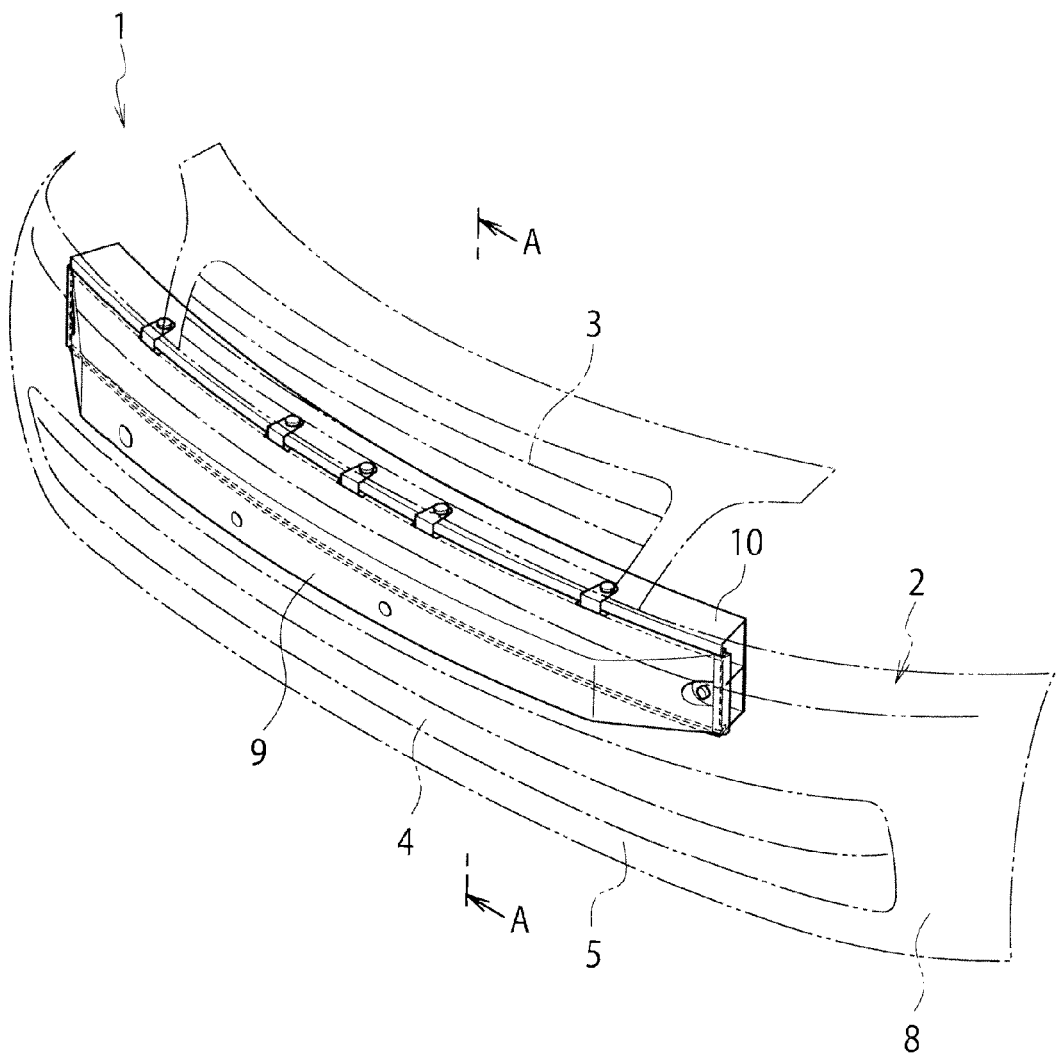
FIG. 1 is a perspective view showing a vehicle front end portion according to a first embodiment of the present invention.
Figure 2:
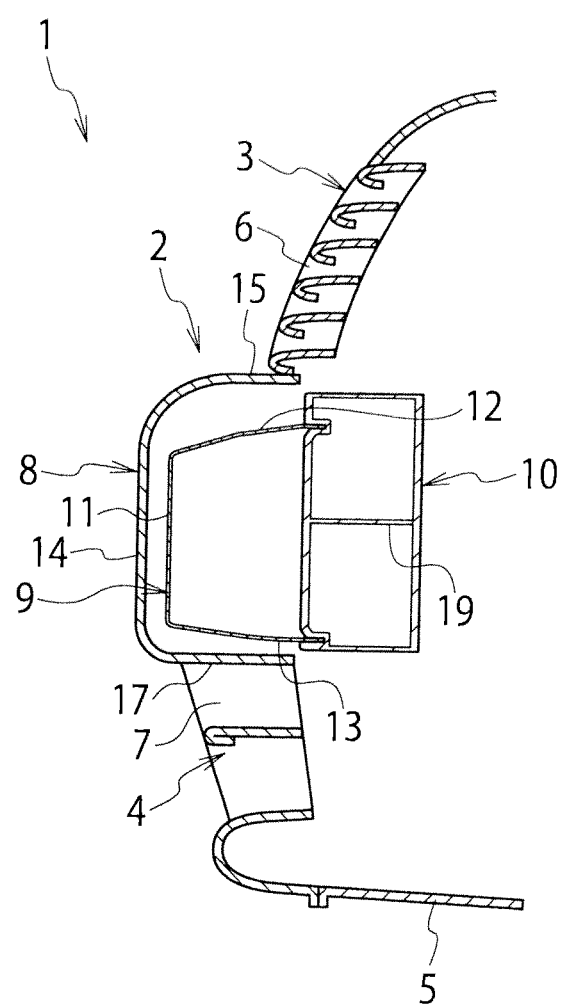
FIG. 2 is a sectional view taken along a line A-A of FIG. 1.
Figure 5:
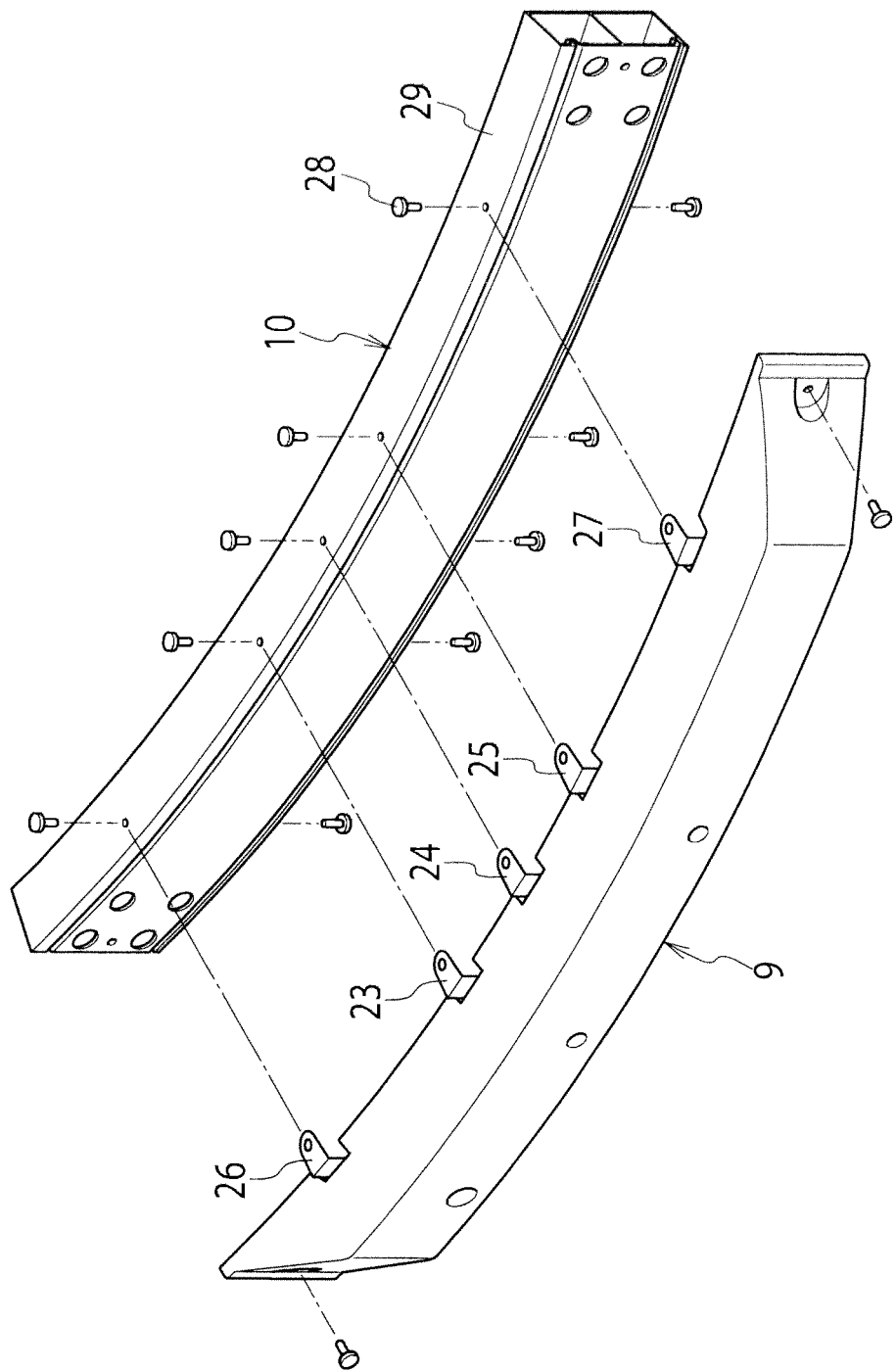
FIG. 5 is an exploded perspective view of FIG. 3.

As shown in FIGS. 1 and 2, a vehicle front end portion 1 is provided with: a front bumper 2 extending along a vehicle width direction, an upper-side front grill 3 arranged on an upper side of the front bumper 2, a lower-side front grill 4 arranged on a lower side of the front bumper 2, and an under cover 5 extending rearward from a lower end of the lower-side front grill 4.

Multiple vent holes 6, 7 are formed in the upper-side front grill 3 and the lower-side front grill 4, and vehicle traveling wind flows into an engine room through the vent holes 6, 7.

As shown in FIGS. 2 to 4, the front bumper 2 includes: a bumper fascia 8 arranged in a vehicle front end, a bumper absorber 9 arranged behind (inside in a front-rear direction) the bumper fascia 8 so as to face the bumper fascia 8, and a bumper reinforcement 10 arranged behind (inside in the front-rear direction) the bumper absorber 9 to support the bumper absorber 9. Note that the lower-side front grill 4 is formed in the bumper fascia 8.

The bumper absorber 9 has a squared U-shaped cross section formed of: a vertical face 11 extending along a top-bottom direction and the vehicle width direction; and a top face 12 and a bottom face 13 respectively extending rearward (inside in the front-rear direction) from a top end and a bottom end of the vertical face 11.

The bumper fascia 8 is formed of: a vertical wall face 14 extending along the top-bottom direction and the vehicle width direction, an upper wall face 15 extending so as to bend rearward from a top end of the vertical wall face 14 and arranged to face an upper side of the top face 12 of the bumper absorber 9, and a lower wall face 17 extending so as to bend rearward from a bottom end of the vertical wall face 14 and arranged to face a lower side of the bottom face 13 of the bumper absorber 9.

Figure 6:
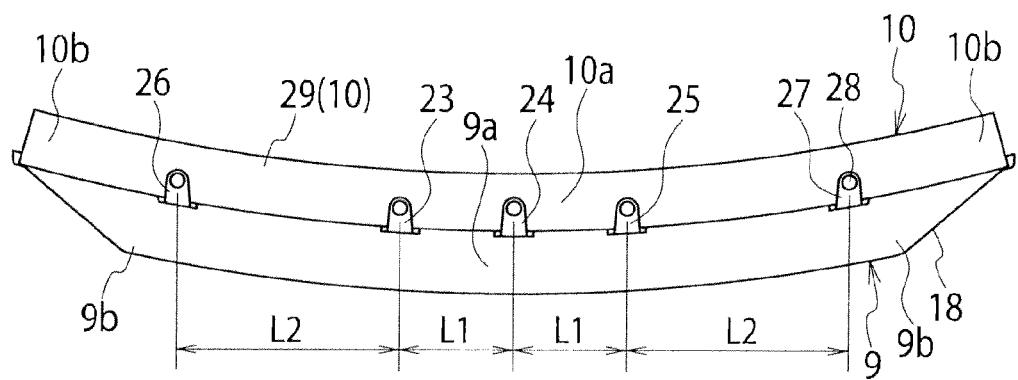
FIG. 6 is a plan view of FIG. 3 as seen from the top.
Figure 7:
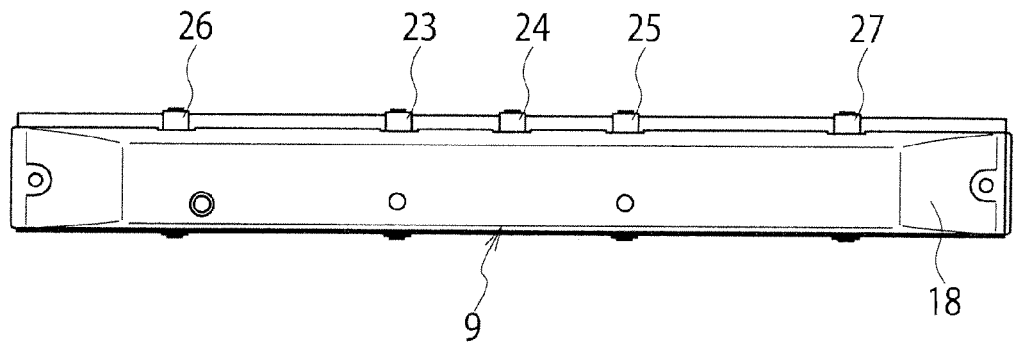
FIG. 7 is a front view of FIG. 3.

As shown in FIGS. 3 and 6, the bumper absorber 9 and the bumper reinforcement 10 are formed to bend in an arc shape in a plan view, in a way that central portions 9a, 10a in the vehicle width direction are arranged closer to a vehicle front side than both end portions 9b, 10b in the vehicle width direction.

Note that an inclined face 18 is provided on each of the both end portions 9b, 9b of the bumper absorber 9 in the vehicle width direction. A thickness of the bumper absorber 9 in the front-rear direction decreases toward the outside in the vehicle width direction. Accordingly, in the bumper absorber 9, the both end portions 9b, 9b have more ridge lines than the central portion 9a in the vehicle width direction, and thus the both end portions 9b, 9b have a higher stiffness than the central portion 9a in the vehicle width direction.

As shown in parts (a) and (b) of FIG. 4, the bumper reinforcement 10 is formed to have an elongated oblong cross section, and a rib 19 is provided in an intermediate height position in the top-bottom direction. With the rib 19, the bumper reinforcement 10 is formed to have a structure including two upper and lower closed cross sections. Moreover, as shown in FIG. 4 (b), an upper and lower pair of grooves 21, 22 recessed rearward are formed in a top end and a bottom end of a front face 20 of the bumper reinforcement 10, and rear ends of the top face 12 and the bottom face 13 of the bumper absorber 9 are respectively fitted thereto. As shown in FIG. 4(a), in the central portion in the vehicle width direction, attachment members 24, 24 formed integrally with the top face 12 and the bottom face 13 of the bumper absorber 9 are respectively fastened to an upper wall 29 and a lower wall 30 of the bumper reinforcement 10 by bolts 28.

As shown in FIGS. 3 and 5 to 7, on the top face 12 and the bottom face 13 of the bumper absorber 9, five attachment members 23 to 27 are formed along the vehicle width direction integrally with the top face 12 and the bottom face 13.

To be specific, three upper and lower pairs of the attachment members 23, 24, 25 are provided in the central portion in the vehicle width direction, and two upper and lower pairs of the attachment members 26, 27 are respectively provided in the both end portions in the vehicle width direction. Each of the attachment members 23 to 27 is bent to have an L-shaped cross section, and is fastened to the upper wall 29 and the lower wall 30 of the bumper reinforcement 10 by bolts 28.

Here, as shown in FIG. 6, a distance between the attachment members 23, 24 along the vehicle width direction is indicated by L1, and a distance between the attachment members 24, 25 along the vehicle width direction is also set to L1. A distance between the attachment members 26, 23 along the vehicle width direction is indicated by L2, and a distance between the attachment members 27, 25 along the vehicle width direction is also set to L2. L1 is a distance shorter than L2, and thus distances L1 of the adjacent attachment members 23, 24 and 24, 25 in the vehicle width direction are set shorter than the distances L2 between the adjacent attachment members 26, 23 and 27, 25 at end portions in the vehicle width direction. Thus, a configuration is employed in which an interval (distance) between the adjacent attachment members 23 to 27 decreases from the end portions in the vehicle width direction toward the central portion in the vehicle width direction. Accordingly, the support stiffness of the bumper absorber 9 for the bumper reinforcement 10 is configured to increase from the end portions in the vehicle width direction toward the central portion in the vehicle width direction.

A description is given with reference to FIG. 8 of the distribution of an impact load in cases where a cylindrical impact body P is crashed with the bumper absorber 9 according to the first embodiment, and where the impact body P is crashed with a bumper absorber 109 according to a comparative example. Note that the bumper absorber 109 according to the comparative example is provided with four attachment members 23, 25, 26, 27 evenly spaced in the vehicle width direction. To be specific, the attachment members 23, 25 at the central portion in the vehicle width direction and the attachment members 26, 27 at the both end portions in the vehicle width directions are all evenly spaced by a distance L3 longer than the aforementioned distance L1.

As shown in FIG. 8(a), when the impact body P crashes with the bumper absorber 9, a large load F1 is applied to a top end portion and a bottom end portion of the vertical face 11 of the bumper absorber 9 over a long area along the vehicle width direction. Additionally, a small load F2 is also applied to an intermediate portion in the top-bottom direction of the vertical face 11 of the bumper absorber 9 over a long area along the vehicle width direction.

Meanwhile, as shown in FIG. 8(b), when the impact body P crashes with the bumper absorber 109, a large load F1 is applied to a top end portion and a bottom end portion of a vertical face 11 of the bumper absorber 109 over a short area along the vehicle width direction. Additionally, a small load F2 is also applied to an intermediate portion in the top-bottom direction of the vertical face 11 of the bumper absorber 109 over a short area along the vehicle width direction.

Thus, it has been found that the bumper absorber 9 according to the first embodiment can receive an input load in a larger area along the vehicle width direction.

Effects of the first embodiment will be described below.

The vehicle bumper according to the first embodiment is the front bumper (vehicle bumper) 2 arranged in the vehicle front end and extending in the vehicle width direction, whose central portion in the vehicle width direction is arranged outside in the front-rear direction more than the end portions in the vehicle width direction. The front bumper 2 includes the bumper fascia 8 provided in the vehicle front end, the bumper absorber 9 provided behind (inside in the front-rear direction) the bumper fascia 8, and the bumper reinforcement 10 arranged behind the bumper absorber 9 to support the bumper absorber 9. The bumper absorber 9 has a squared U-shaped cross section formed of: the vertical face 11 extending along the top-bottom direction and the vehicle width direction; and the top face 12 and the bottom face 13 respectively extending rearward from the top end and the bottom end of the vertical face 11. In the bumper absorber 9, the both end portions 9b, 9b have more ridge lines than the central portion 9a in the vehicle width direction, and thus the both end portions 9b, 9b have a higher stiffness than the central portion 9a in the vehicle width direction. In contrast, the support stiffness of the bumper absorber 9 for the bumper reinforcement 10 is set to increase from the end portions 9b in the vehicle width direction toward the central portion 9a in the vehicle width direction.

Specifically, the bumper absorber 9 is configured such that the top face 12 and the bottom face 13 thereof are supported by the bumper reinforcement 10 via the multiple attachment members 23 to 27. The interval between the attachment members adjacent to each other in the vehicle width direction is set to decrease from the end portions 9b in the vehicle width direction toward the central portion 9a in the vehicle width direction.

Thus, the bumper absorber 9 itself is formed to have a higher stiffness at the both end portions 9b, 9h than at the central portion 9a in the vehicle width direction, while the support stiffness of the bumper absorber 9 for the bumper reinforcement 10 is set to increase from the end portions 9b in the vehicle width direction toward the central portion 9a in the vehicle width direction, by varying the interval between the adjacent attachment members. As a result, according to the first embodiment, obtained through less manufacturing processes is a vehicle bumper capable of absorbing an equal amount of energy in a large area along the vehicle width direction. It is particularly efficient since the amount of energy to be absorbed can be equalized for a large area, by a simple structure change of varying the interval between adjacent attachment members.

Second Embodiment

Next, a second embodiment of the present invention will be described. In the description, portions having the same structure as the aforementioned first embodiment are assigned the same reference numerals, and descriptions thereof are omitted.

Figure 9:
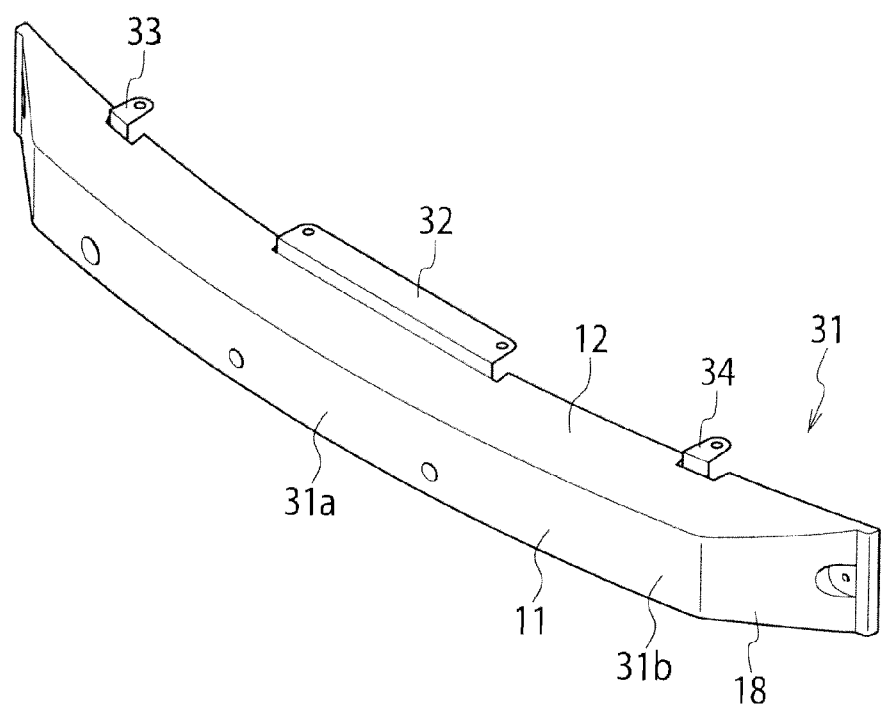
FIG. 9 is a perspective view showing a bumper absorber according to a second embodiment.

As shown in FIG. 9, in a bumper absorber 31 according to the second embodiment, a single attachment member 32 is arranged at a central portion in a vehicle width direction, and a left and right pair of attachment members 33, 34 are arranged at both end portions in the vehicle width direction. These attachment members 32 to 34 are members supporting the bumper absorber 31 on an upper wall 29 of a bumper reinforcement 10, as in the case of the first embodiment.

Figure 10:
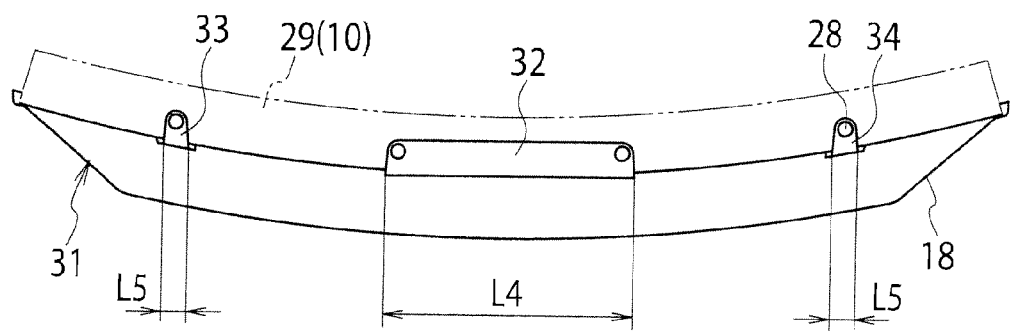
FIG. 10 is a plan view of FIG. 9 as seen from the top.

As shown in FIG. 10, a width dimension of the attachment member 32 along the vehicle width direction is indicated by L4, the attachment member 32 being provided at the central portion in the vehicle width direction; and a width dimension of each of the attachment members 33, 34 along the vehicle width direction is indicated by L5, the attachment members 33, 34 being provided at the both end portions in the vehicle width direction. L4 is formed much larger than L5. Accordingly, a configuration is employed in which the support stiffness of the bumper absorber 31 for the bumper reinforcement 10 also increases from the end portions in the vehicle width direction toward the central portion in the vehicle width direction.

In addition, as in the case of the aforementioned first embodiment, the bumper absorber 31 itself has a higher stiffness at end portions 31b than at a central portion 31a in the vehicle width direction.

Effects of the second embodiment will be described below.

In the second embodiment, the width dimension L4 in the vehicle width direction of the attachment member 32 arranged at the central portion in the vehicle width direction is set larger than the width dimension L5 in the vehicle width direction of each of the attachment members 33, 34 arranged at the end portions in the vehicle width direction. Additionally, the bumper absorber 31 itself is set to have a higher stiffness at the end portions 31b in the vehicle width direction than at the central portion 31a in the vehicle width direction. As a result, it is efficient since the amount of energy to be absorbed can be equalized for a large area along the vehicle width direction by a simple structure change.

Third Embodiment

Next, a third embodiment of the present invention will be described. In the description, portions having the same structure as the aforementioned first or second embodiment are assigned the same reference numerals, and descriptions thereof are omitted.

Figure 11:
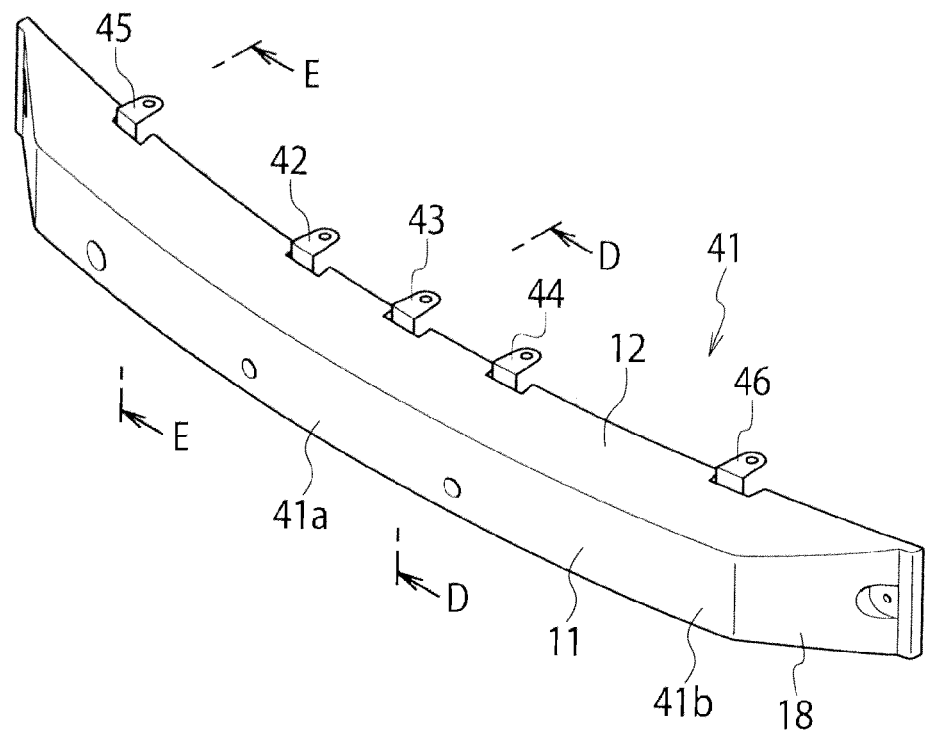
FIG. 11 is a perspective view showing a bumper absorber according to a third embodiment.

As shown in FIG. 11, in a bumper absorber 41 according to the third embodiment, three attachment members 42 to 44 are provided at a central portion in a vehicle width direction, and two attachment members 45, 46 are provided at both end portions in the vehicle width direction. The attachment members 42 to 46 are provided in the same positions as in the first embodiment.

Figure 12:
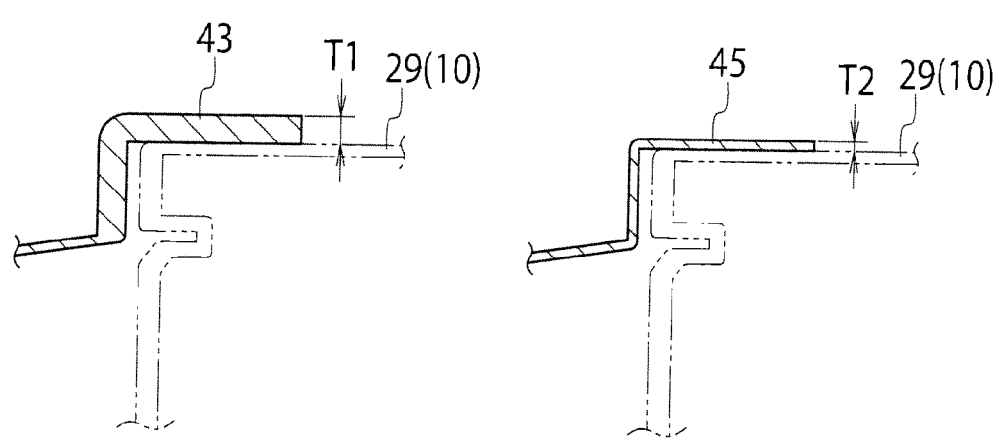
FIG. 12 Part (a) is an enlarged sectional view taken along a line D-D of FIG. 11, and part (b) is an enlarged sectional view taken along a line E-E.

However, as shown in FIG. 12(a), thicknesses of the three attachment members 42 to 44 arranged at the central portion in the vehicle width direction are all indicated by T1. Meanwhile, thicknesses of the attachment members 45, 46 at the both end portions in the vehicle width direction are indicated by T2. T1 is formed thicker than T2. Accordingly, a configuration is employed in which the support stiffness of the bumper absorber 41 for a bumper reinforcement 10 also increases from the end portions in the vehicle width direction toward the central portion in the vehicle width direction.

In addition, as in the case of the aforementioned first and second embodiments, the bumper absorber 41 itself has a higher stiffness at end portions 41b in the vehicle width direction than at a central portion 41a in the vehicle width direction.

Effects of the third embodiment will be described below.

In the third embodiment, the thickness T1 of the attachment members 42 to 44 arranged at the central portion in the vehicle width direction is set larger than the thickness T2 of the attachment members 45, 46 arranged at the end portions in the vehicle width direction. Additionally, the bumper absorber 41 itself is set to have a higher stiffness at the end portions 41h in the vehicle width direction than at the central portion 41a in the vehicle width direction. As a result, it is efficient since the amount of energy to be absorbed can be equalized for a large area along the vehicle width direction by a simple structure change.

Note that the entire contents of Japanese Patent Application No. 2010-228568 (filed: Oct. 8, 2010) are incorporated herein.

Although the contents of the present invention have been described by use of the embodiments, the present invention is not limited thereto. It is obvious to those skilled in the art that various modifications and improvements are possible.

INDUSTRIAL APPLICABILITY

According to the present invention, it is possible to manufacture through less manufacturing processes a vehicle bumper capable of absorbing a much equal amount of energy in a large area along the vehicle width direction.

REFERENCE SIGNS LIST 2 front bumper (vehicle bumper)
8 bumper fascia
9, 31, 41 bumper absorber 10 bumper reinforcement
11 vertical face
12 top face
13 bottom face
23 to 27, 32 to 34, 42 to 46 attachment member

The invention claimed is:

1. A vehicle bumper comprising:
a bumper fascia provided in any of a front end and a rear end of a vehicle and extending in a vehicle width direction;
a bumper absorber arranged inside the bumper fascia in a front-rear direction and having a stiffness that is higher at end portions in the vehicle width direction than at a central portion in the vehicle width direction, the bumper absorber having
a substantially U-shaped cross section formed of a vertical face extending in a top-bottom direction and the vehicle width direction, and
a top face and a bottom face respectively extending inward from a top end and a bottom end of the vertical face in the front-rear direction; and
a bumper reinforcement arranged on the bumper absorber in the front-rear direction to support the bumper absorber,
wherein a support stiffness between the bumper absorber and the bumper reinforcement is set to increase from the end portions in the vehicle width direction toward the central portion in the vehicle width direction, and
wherein the bumper absorber is fastened to an upper wall and a lower wall of the bumper reinforcement via a plurality of attachment members.

2. The vehicle bumper according to claim 1, wherein
the bumper absorber is configured such that the top face and the bottom face thereof are supported by the bumper reinforcement via the plurality of attachment members, and
an interval between the attachment members adjacent to each other in the vehicle width direction is set to be smaller at the central portion in the vehicle width direction than at the end portions in the vehicle width direction.

3. The vehicle bumper according to claim 1, wherein
the bumper absorber is configured such that the top face and the bottom face thereof are supported by the bumper reinforcement via the plurality of attachment members, and
a width dimension in the vehicle width direction of the attachment member arranged at the central portion in the vehicle width direction is set to be larger than a width dimension in the vehicle width direction of the attachment member arranged at each of the end portions in the vehicle width direction.

4. The vehicle bumper according to claim 1, wherein
the bumper absorber is configured such that the top face and the bottom face thereof are supported by the bumper reinforcement via the plurality of attachment members, and
a thickness of the attachment member arranged at the central portion in the vehicle width direction is set to be larger than a thickness of the attachment member arranged at each of the end portions in the vehicle width direction.

5. The vehicle bumper according to claim 1, wherein
the bumper absorber is configured such that the top face and the bottom face thereof are supported by the bumper reinforcement via the plurality of attachment members, and
an interval between the attachment members adjacent to each other in the vehicle width direction is set to decrease from the end portions in the vehicle width direction toward the central portion in the vehicle width direction.

6. The vehicle bumper according to claim 1, wherein
the bumper absorber is configured such that the top face and the bottom face are supported by the bumper reinforcement via the plurality of attachment members including two outermost attachment members each disposed on respective end portions,
wherein an interval between adjacent attachment members excluding the outermost attachment members is set to be less than an interval between each of the outermost attachment members and the attachment members adjacent to the outermost attachment members.

7. The vehicle bumper according to claim 1, wherein
the bumper absorber is configured such that the top face and the bottom face are supported by the bumper reinforcement via the plurality of attachment members, and
each of the attachment members is configured to be bent so as to have an L-shaped cross section.

8. The vehicle bumper according to claim 1, wherein the vehicle bumper is configured such that the vehicle bumper is capable of absorbing an equal amount of energy over a large area along the vehicle width direction.

9. The vehicle bumper according to claim 1, wherein
the bumper absorber is configured such that the top face and the bottom face thereof are supported by the bumper reinforcement via the plurality of attachment members, and
an interval between the attachment members adjacent to each other in the vehicle width direction is set to not increase from the end portions in the vehicle width direction toward the central portion in the vehicle width direction.

10. The vehicle bumper according to claim 1, wherein
the attachment members are formed as an integral part of the upper and lower walls of the bumper absorber.

* * * * *